(12) United States Patent
Rus

(10) Patent No.: US 10,294,681 B2
(45) Date of Patent: May 21, 2019

(54) FIBERBOARD SURFACE PROTECTION SYSTEM

(71) Applicant: Garland Industries, Inc., Cleveland, OH (US)

(72) Inventor: Melissa Rus, Cleveland, OH (US)

(73) Assignee: Garland Industries, Inc., Cleveland, OH (US)

( * ) Notice: Subject to any disclaimer, the term of this patent is extended or adjusted under 35 U.S.C. 154(b) by 87 days.

(21) Appl. No.: 15/401,467

(22) Filed: Jan. 9, 2017

(65) Prior Publication Data

US 2017/0183884 A1    Jun. 29, 2017

Related U.S. Application Data

(63) Continuation-in-part of application No. 15/377,347, filed on Dec. 13, 2016.

(60) Provisional application No. 62/271,752, filed on Dec. 28, 2015.

(51) Int. Cl.
*E04G 21/30* (2006.01)
*B32B 38/10* (2006.01)
*B32B 7/06* (2019.01)

(52) U.S. Cl.
CPC .............. *E04G 21/30* (2013.01); *B32B 38/10* (2013.01); *B32B 7/06* (2013.01)

(58) Field of Classification Search
USPC ......... 156/71, 247, 249, 304.1, 304.3, 304.4
See application file for complete search history.

(56) References Cited

U.S. PATENT DOCUMENTS

| | | |
|---|---|---|
| 2003/0170452 A1 | 9/2003 | Hansen |
| 2004/0213937 A1 | 10/2004 | Arthur |
| 2004/0261346 A1 | 12/2004 | Gibney |
| 2007/0128961 A1* | 6/2007 | Camp ............... B32B 27/12 442/85 |
| 2009/0077901 A1 | 3/2009 | Brooks |
| 2012/0189810 A1* | 7/2012 | Whitener ............. B05D 3/12 428/141 |
| 2013/0236676 A1 | 9/2013 | Doyle |
| 2014/0224391 A1 | 8/2014 | Muxlow |

FOREIGN PATENT DOCUMENTS

| | | |
|---|---|---|
| CN | 20332090 | 12/2013 |
| EP | 1570911 | 9/2005 |
| EP | 2338679 | 6/2011 |
| WO | 2011146342 | 11/2011 |

OTHER PUBLICATIONS

European Patent Office, Extended European Search Report in related EP Patent Application No. 17155301.9 (dated Jul. 25, 2017).

* cited by examiner

*Primary Examiner* — Sing P Chan
(74) *Attorney, Agent, or Firm* — Fay Sharpe LLP

(57) ABSTRACT

A surface protector is provided formed of a sheet having at least one preapplied adhesive strip used to connect together and an adjacently positioned surface protector to form a dust-proof and/or liquid-proof seal between the two surface protectors.

38 Claims, 11 Drawing Sheets

FIBERBOARD SURFACE PROTECTION SYSTEM

This application is a continuation-in-part of U.S. patent application Ser. No. 15/377,347 filed Dec. 13, 2016, which in turn claims priority on U.S. Provisional Patent Application Ser. No. 62/271,752, filed Dec. 28, 2015, the disclosure of which is incorporated herein by reference.

The present disclosure relates generally to protective coverings, and more particularly to a protective covering for protecting finished work and other surfaces during construction, moving, painting, or other activities, and a method of manufacturing the protective covering.

BACKGROUND OF THE INVENTION

The process of building out an area or constructing a building occurs in many phases. During this process, a number of different types of workers are required and it may be necessary to complete the construction in steps. As a result, frequently contractors damage floors, stairs, countertops, and other finished work in the process of completing other tasks and moving in and out heavy equipment.

During the last stages of house or building construction, and after floor and countertop materials already have been installed, finish work such as painting, caulking, finish carpentry, and appliance and lighting fixture installation is typically done. This finish work can often cause significant damage to plastic laminates, linoleum, hardwood, ceramic tiles, and carpets before the building is finished, sold, or moved into. Heavy tools, caulking and paint buckets, and appliance edges are particularly damaging.

Traditionally, the only protection, if any, given to floors and countertops during the final stages of construction has been a thin fabric drop cloth or a thin plastic sheet such as the 0.002 inch thick self-adhesive plastic sheet. These sheets help protect against paint or caulking splatters and soil on workers' feet, but do not protect against gouges, scrapes, abrasion, or other damage and breakage due to impact of objects or moving of equipment/tools.

Fabric throw rugs or moving van-style blankets can be used but these absorb liquids, snag and catch on appliances, and do not protect against sharp and forceful impact. Also, these covers are bulky and heavy to transport and store.

Other products are designed to protect floors or walls independently, but not both at the same time with one product. These products leave the base of walls and the perimeter of the floor exposed to damage. It is to be appreciated that where separate products are used to protect the floor and the wall, the lower section of walls, including the baseboards, can be easily damaged on job sites. Additionally, present products do not protect from liquid spills occurring at or near the junction between the wall and floor.

In view of the current state of the art, an improved fiberboard sheet was developed as disclosed in United States Patent Publication No. US 2014/0224391 and U.S. Design application No. 29/497,796 (filed Jul. 29, 2014), which are both incorporated herein by reference. Although this fiberboard sheet provides protection to a floor surface when multiple fiberboard sheets are used, the fiberboard sheets can separate from one another and expose the floor between the separated sheets. In order to address this issue, the end edges of adjacent fiberboard sheets are overlapped. However, during use of the fiberboard sheets, the sheets can move relative to one another and allow a space to form between the fiberboard sheets. Also, sawdust, screws, nails, clips, etc. that fall on the top surface of a fiberboard sheet can work its way between the overlapped sheet and onto a floor surface during the use of the fiberboard sheets. Such materials can cause damage to the floor surface once such materials are in contact with the floor surface and workers walk on the fiberboard sheets and cause such materials to be pressed into the floor surface. Furthermore, liquid spills on the fiberboard sheets can seep between the overlapped fiberboard sheets and onto a floor surface and thereby potentially damage the floor surface. Generally, a user must overlap the fiberboard sheets and then get on his/her knees and cut and paste adhesive tape over the overlapped seam of the fiberboard sheets. For many workers, getting up and down on ones knees to tape over overlapped fiberboard sheets is time consuming, can be difficult for some workers, and requires additional materials (such a tape) at the jobsite to complete the installation of the fiberboard sheet over a surface to be protected.

In view of the current state of floor coverings, there is a need for a floor covering that is easy to use, protects a floor surface against sharp and forceful impact, protects the lower section of walls (including the baseboards), and which can be easily connected together.

SUMMARY OF THE INVENTION

The present invention is directed to a surface protector formed of a sheet having an adhesive strip positioned on or closely adjacent to one or more edges of the sheet. As can be appreciated that the sheet can be formed of different types of materials (e.g., paperboard, fiberboard, plastic, fabric, composite materials, fiberglass, nylon or other types of polymers, etc.). In one non-limiting arrangement, the sheet is formed of a flexable or rollable material. As defined herein, a 'rollable material' is a material having a longitudinal length of at least 10 feet that can be hand rolled by a single individual into a roll having a diameter of less than 12 inch without causing creases that run from side edge to side edge to be formed in the material as the sheet is rolled. The thickness of the sheet is non-limiting. In one non-limiting arrangement, the sheet is formed of paperboard or fiberboard. As defined herein, 'fiberboard' is a type of engineered wood product that is made out of wood fibers. The general types of fiberboard (in order of increasing density) include particle board, medium-density fiberboard, and hardboard. Plywood is not a type of fiberboard, as it is made of thin sheets of wood, not wood fibers or particles. Cardboard is also not paperboard or fiberboard since it includes a corrugated layer. In one non-limiting configuration, the paperboard or fiberboard that forms the sheet of the surface protector has a thickness of less than 0.5 inches; however, this is not required. In another non-limiting configuration, the paperboard or fiberboard is generally a water-resistant paperboard or fiberboard; however, this is not required.

The surface protector can include one or more adhesive strips positioned on one or both sides of the sheet. The adhesive strip is a preapplied adhesive strip that includes a removable top protective release liner that, when removed, exposes a top adhesive surface of the adhesive strip. The exposed top adhesive surface of the adhesive strip is designed to bond with a portion of another surface protector that is positioned on the exposed top adhesive surface. The adhesive bond between the two sheets of the two surface protectors that is formed by the adhesive strip is a dust-proof bond, and can optionally also be a liquid-proof bond. During installation of multiple surface protectors of the present invention, a first sheet of the surface protector is positioned on a floor surface to be covered. After the first sheet of the surface protector is positioned on a floor surface, the removable release liner is removed from the top adhesive surface of the adhesive strip. An edge of a second sheet of the surface protector is positioned over and then on the exposed top adhesive surface of the adhesive strip on the first sheet of the surface protector. Thereafter, the user can walk on the top surface of the second sheet in the area of the top adhesive surface of the adhesive strip on the first sheet to complete the adhesive bonding of the first and second sheets of the two surface protectors. The adhesive bond forms a dust-proof bond between the two surface protectors, and also optionally a liquid proof seal between the two surface protectors. This process can then be repeated to secure additional surface protectors together. For example, when a third surface protector is to be connected to the side of the second surface protector, the removable release liner on the second surface protector is removed from the top adhesive surface of the adhesive strip. An edge of a third sheet of the surface protector is positioned over and then on the exposed top adhesive surface of the adhesive strip on the second surface protector. Thereafter, the user can walk on the top surface of the third sheet in the area of the top adhesive surface of the adhesive strip on the second surface protector to complete the adhesive bonding of the second and third surface protectors. As can be appreciated, fourth, fifth, etc. surface protectors can be connected together if so required. This arrangement eliminates the need for users to get down on their knees to apply tape over the overlapping edges of the two surface protectors. The removable release liner can be removed from the adhesive strip prior to, during, or after the sheet being placed on the floor surface; however, this is not required. The removable liner can also be removed from one surface protector as the other surface protector is being laid over the prior laid surface protector. In such an installation method, the user need not bend completely over or get on his/her knees to adhesively connect together the two surface protector. The use of the preapplied adhesive strip on the surface protector eliminates the need to apply a separate piece of tape over the overlapping edges of two surface protectors and also makes installation of the sheets faster and easier.

The width and thickness of the adhesive strip is non-limiting. Generally, the width of the preapplied adhesive strip is 0.25-8 inches and all values and ranges there between (e.g., 1 inch, 2 inches, 2.5 inches, etc.) however, larger widths can be used. Generally, the width of each of the adhesive strip is about 0.01%-10% the width of the sheet of the surface protector (and all values and ranges therebetween), and more typically about 1-8% the width of the sheet of the surface protector. The thickness of the adhesive strip is generally less than 0.25 inches; however, greater thickness can be used. The adhesive is selected and formulated such that, when the adhesive is connected to the surface of another surface protector, a dust-proof and optionally a water-resistant or waterproof seal is formed between the two surface protectors at the location of the adhesive strip; however, this is not required. The composition of the adhesive that forms the adhesive strip is non-limiting. The adhesive is selected and formulated such that when the adhesive is connected to the surface of another sheet, the connection is a permanent connection. Such permanent connection is defined such that when two surface protector that are connected together by the adhesive strip are forcibly separated from one another, one or more surfaces of the sheets of one or both surface protectors are torn or damaged and/or the adhesive strip is damaged due to the forced separation of the surface protectors. As a result of such damage, a dust-proof seal and/or liquid-proof seal cannot be reformed along the complete length of the adhesive strip if the two previously connected surface protectors are attempted to be reconnected together at the adhesive strip. A non-permanent connection would result in the surface protector and adhesive strip not being torn or damaged due to the separation of the two sheets.

In one non-limiting aspect of the invention, the width of the releasable release liner is generally the same or slightly greater than the width of the adhesive strip. Generally, the width of the adhesive strip and releasable release liner are constant along the longitudinal length of the surface protector; however, this is not required. The thickness of the releasable release liner is generally greater than the thickness of the adhesive strip; however, this is not required. The material of the releasable release liner is generally different from the composition of the adhesive used to form the adhesive strip. The top surface of the releasable release liner is generally a non-stick surface; however, this is not required. The thickness of the adhesive is generally less than the thickness of the sheet of the surface protector; however, this is not required. The thickness of the releasable release liner is also generally less than the thickness of the sheet of the surface protector; however, this is not required. In one non-limiting arrangement, the thickness of the adhesive strip is no more than 0.25 inches; however this is not required. In one specific configuration, the thickness of the adhesive strip is no more than about 0.05 inches. In another non-limiting arrangement, the thickness of the releasable release liner is no more than 0.2 inches; however this is not required. In one specific configuration, the thickness of the adhesive strip is no more than about 0.1 inches.

In another non-limiting aspect of the invention, one or more adhesive strips are positioned on or adjacent to one or both side edges of the sheet of the surface protector; however, this is not required. In one non-limiting embodiment, the sheet of the surface protector only includes a single adhesive strip positioned along one side edge of the sheet. The adhesive strip can be positioned on the side edge or spaced at some distance (e.g., 0.01-5 inches, etc.) from the side edge of the sheet of the surface protector. Generally, the adhesive strip is positioned parallel to the side edge; however, this is not required. In an additional or alternative non-limiting embodiment, the sheet of the surface protector includes two or more adhesive strips positioned along one side edge of the sheet. One of the adhesive strips can be positioned on the side edge or spaced at some distance (e.g., 0.01-5 inches, etc.) from the side edge of the sheet of the surface protector. The one or more other adhesive strips can be positioned next to one another or be spaced from one another (e.g., 0.01-4 inches, etc.). Generally, the adhesive strips are positioned parallel to one another; however, this is not required. Generally, the adhesive strips are positioned parallel to the side edge of the sheet of the surface protector; however, this is not required. In an additional or alternative non-limiting embodiment, the sheet of the surface protector includes one or more adhesive strips positioned along each of the two side edges of the sheet. One of the adhesive strips can be positioned on the first side edge or spaced at some distance (e.g., 0.01-5 inches, etc.) from the first side edge. Another of the adhesive strips can be positioned on the second side edge or spaced at some distance (e.g., 0.01-5 inches, etc.) from the second side edge. If the sheet of the surface protector includes two or more adhesive strips at or near the first and/or second side edges of the sheet, the one or more other adhesive strips can be positioned next to one another or be spaced from one another (e.g., 0.01-4 inches, etc.). Generally, the adhesive strips are positioned parallel to one another; however, this is not required. Generally, the adhesive strips are positioned parallel to the first and/or second side edges of the sheet of the surface protector; however, this is not required. In an additional or alternative non-limiting embodiment, the sheet of the surface protector includes one or more adhesive strips positioned on a top surface of the sheet and along one or both side edges of the sheet and one or more adhesive strips positioned on a bottom surface of the sheet and along one or both side edges of the sheet. In such an arrangement, the top or bottom surface of the sheet can face a floor surface and the side opposite the floor surface would have one or more adhesive strips that could be used to connect to another sheet. As can also be appreciated, one or more adhesive strips could be used to facilitate in securing one surface of the sheet of the surface protector to a floor surface and the one or more adhesive strips on the opposite side of the sheet could then be used to connect to another sheet. The positioning of the one or more adhesive strips on the top and bottom surfaces of the sheet of the surface protector can be spaced the same or different distances from the first or second side edges of the sheet. The orientation of the one or more adhesive strips on the top and bottom surface of the sheet can be the same or different from the adhesive strip configuration discussed above. In an additional or alternative non-limiting embodiment, the sheet of the surface protector includes one or more adhesive strips positioned along the front edge and/or end edge the sheet. Generally, the sheet has a first and second side edge that runs along the longitudinal length of the sheet. Generally, the first and second side edges are parallel to one another; however, this is not required. The front edge and end edges run between the first and second edges of the sheet and are generally normal (e.g. 80°-110°) to the two side edges. Generally, the front and end edges are parallel to one another; however, this is not required. In one non-limiting configuration, one of the adhesive strips can be positioned on the front edge or spaced at some distance (e.g., 0.01-5 inches, etc.) from the front edge. Likewise, one of the adhesive strips can also or alternatively be positioned on the end edge or spaced at some distance (e.g., 0.01-5 inches, etc.) from the end edge. One or more other adhesive strips can be optionally positioned next to one another or be spaced from one another (e.g., 0.01-4 inches, etc.). Generally, the adhesive strips are positioned parallel to one another; however, this is not required. Generally, the adhesive strips are positioned parallel to the front edge and/or end edge of the sheet; however, this is not required. The one or more adhesive strips that are positioned at or near the front edge and/or end edge can be positioned on the top and/or bottom side of the sheet of the surface protector. In one non-limiting configuration, one or more adhesive strips are positioned on the top side of the sheet at or near the front edge and/or end edge. In another non-limiting configuration, one or more adhesive strips are positioned on the bottom side of the sheet at or near the front edge and/or end edge. In another non-limiting configuration, one or more adhesive strips are positioned on the top and bottom sides of the sheet of the surface protector at or near the front edge and/or end edge. In another non-limiting configuration, one or more adhesive strips are positioned on the bottom side of the sheet of the surface protector at or near the front edge and one or more adhesive strips that are positioned on the top side of the sheet at or near the end edge. In another or alternative non-limiting configuration, one or more of the adhesive strips that runs between the side edges of the sheet of the surface protector is positioned between one of the adhesive strips positioned on or closely to the front edge and to one of the adhesive strips positioned on or closely to the end edge. Generally, the one or more adhesive strips positioned between the adhesive strips located at or near the front and end edges of the sheet are positioned generally parallel to the front and/or end edges and/or generally parallel to the adhesive strips located at or near the front and end edges of the sheet; however, this is not required. Generally, the one or more adhesive strips positioned between the adhesive strips located at or near the front and end edges of the sheet are spaced from one another (e.g., 0.5 ft-50 ft. and all values and ranges therebetween); however, this is not required.

In another non-limiting aspect of the present invention, the width of the adhesive strip is generally about 0.25-8 inches (and all values and ranges therebetween); however, larger widths can be used. Generally, the width of each of the adhesive strip is about 0.5%-10% the width of the sheet of the surface protector (and all values and ranges therebetween), and more typically about 2-8% the width of sheet of the surface protector. The width of the releasable release liner is generally the same or slightly greater than the width of the adhesive strip. Generally, the width of the adhesive strip and releasable release liner are constant along the longitudinal length of the surface protector and generally run parallel to an edge of the sheet of the surface protector; however, this is not required.

In another non-limiting aspect of the present invention, the sheet can optionally include one or more embedded creases, wherein each of the creases can be folded in order to position a portion of the sheet horizontally and another portion of the sheet vertically. The term crease used herein includes scoring or perforating the surface of the sheet of the surface protector. The one or more creases can provide a quick and easy folding of the sheet of the surface protector, along one or more crease lines, to allow for simultaneous horizontal and vertical protection within a single product. The one or more creases in the sheet of the surface protector can eliminate the need for two or more separate products and extra steps in the protection process. The surface protector can create a seamless barrier between a horizontal and a vertical junction of orthogonally adjacent surfaces such as, for example, a floor and a wall extending upwardly therefrom. The one or more creases (when used) can be located only on the top surface of the sheet of the surface protector, only on the bottom surface of the sheet of the surface protector, or on both the top and bottom surface of the sheet of the surface protector. The one or more creases formed in the sheet of the surface protector are designed to enable the sheet to be folded along the crease without causing the sheet to tear or separate along the crease. A very durable, bendable and flexible material for the sheet can be used. In the past, the folding of paperboard or fiberboard used for surface protection of floor surfaces commonly resulted in the breakage or improper bending of the paperboard or fiberboard, thus making it undesirable for a floor protection system. Cardboard has been used in the past since it can be easily folded; however, cardboard is not as dense and durable as fiberboard of the similar thicknesses and subsequently does not provide for the desired floor protection in many applications. The number of creases on the top and/or bottom of the sheet of the surface protector is non-limiting (e.g., 1-20 creases, 2-10 creases, 2-5 creases, 3 creases, etc.). The number of creases may vary due to the custom needs of users. Generally, one or more creases run along the longitudinal length of the sheet of the surface protector; however, this is not required. In one non-limiting configuration, the sheet of the surface protector includes two generally parallel sides that run along the longitudinal length of the sheet and one or more creases run generally parallel to the sides. When two or more creases are used on the sheet and run along the longitudinal length of the sheet, the two or more crease are generally parallel to one another; however, this is not required. The one or more creases (when used) are offset a distance inward from the outer perimeter or edge of the sheet of the surface protector. Generally, each of the creases are spaced a greater distance from an edge of the surface protector than the adhesive strip; however, this is not required. In one non-limiting configuration, one side of the surface protector includes one or more creases. In another non-limiting configuration, two opposing sides of the surface protector each include one or more creases. The surface protector, when it includes one or more creases, is designed to be folded along the one or more creases, thereby creating a first portion and a second portion. The first portion of the surface protector protects a first surface and the second portion of the surface protector protects a second surface. The first surface is generally orthogonal to the second surface; however, this is not required (e.g., 5-150° and all values and ranges therebetween). When two or more creases are included on the sheet, each crease includes a respective offset from a side of the sheet that is different from another crease; however, this is not required. In one non-limiting arrangement, at least two of the creases are proximal to one side of the perimeter of the sheet and offset at different positions relative to one side. One or more of the creases (when used) can be perforated and/or water resistant; however, this is not required. In one non-limiting configuration, the one or more creases on the sheet of the surface protector are water resistant prior to and after the sheet is folded along the crease; however, this is not required. A creasing wheel can optionally be used to form the one or more creases in the sheet. The one or more creases in the sheet can have a depth from about 5% to about 40% of a depth of the sheet (and all values and ranges therebetween), and typically about 10% to 20% of a depth of the sheet. In one non-limiting arrangement, the one or more creases in the sheet of the surface protector includes a depth from about 12-16% of a depth of the sheet. Generally, the depth of the crease is constant along the length of the crease; however, this is not required. The width of the one or more creases is generally about 0.05-0.5 inches (and all values and ranges therebetween). The one or more creases (when used) are generally positioned about 1 to 18 inches (and all values and ranges therebetween) from the perimeter of the paperboard or fiberboard; however other distances can be used. The one or more creases can be colored to facilitate in the visual location of the crease; however, this is not required.

In another non-limiting aspect of the present invention, the surface protector can be a non-reusable (i.e., one-time use) surface protector; however, this is not required. The surface protector includes a sheet of foldable or bendable material (e.g., paperboard or fiberboard material, etc.) having a perimeter, a top surface and a bottom surface, and at least one adhesive strip. Generally, the sheet includes a front edge, a rear edge, a first side edge, a second side edge, a top surface and a bottom surface; however, this is not required. Also, the sheet generally has a square or rectangular shape when viewing the top surface of the sheet; however, this is not required. The surface protector can be in the form of a roll of surface protector or be formed in individual sheets. When the surface protector is in a roll, the roll is generally 10-200 ft. in length (and all values and ranges therebetween); however, longer lengths can be used. When the surface protector is in a roll, the material and thickness of the surface protector is selected so that the surface protector can be rolled into a roll and unrolled from the roll without damage or creasing the surface protector. Generally, the thickness of the sheet of the surface protector when in roll form is less than 0.5 inches and typically no more than 0.2 inches; however this is not required. When the sheet is formed of paperboard or fiberboard, the sheet generally has a thickness of at least about 0.05 inches and typically no more than about 0.2 inches; however, this is not required. Such a thickness provides for the desired surface protection and water resistance generally desired for floor protection. When the surface protector is in the form of individual sheets, the surface protector is generally about 2-20 ft. in length (and all values and ranges therebetween); however, longer lengths can be used. The width of the surface protector when in a roll form or in individual sheet form is generally about 1-10 ft. (and all values and ranges therebetween); however, greater widths can be used. The surface protector is generally formed of a material that is water resistant or water impermeable. In one non-limiting configuration, the surface protector is formed of a material that prevents full penetration of water through the thickness of the surface protector for at least about 5 minutes, typically at least about 10 minutes, more typically at least about 30 minutes, even more typically at least about one hour, and still even more typically at least about 12 hours.

The invention is also directed to a method of forming the surface protector. The method can include the steps of a) providing a sheet (e.g., paperboard or fiberboard sheet) having a perimeter, and b) applying an adhesive strip at or near at least one edge of the sheet. The method can also include the steps of a) providing a sheet (e.g., paperboard or fiberboard sheet) having a perimeter, b) applying an adhesive strip at or near at least one edge of the sheet, c) optionally scoring or pressing the sheet to include one or more creases aligned generally parallel to at least one side of the sheet, and d) positioning the crease to be offset from the perimeter of the sheet.

In one non-limiting object of the present invention, there is provided a surface protector that provides protection to floor and/or wall surfaces.

In another and/or alternative non-limiting object of the present invention, there is provided a surface protector that includes one or more adhesive strips on the top and/or bottom side of the surface protector used to connect together an adjacently positioned surface protector.

In still another and/or alternative non-limiting object of the present invention, there is provided a surface protector that includes one or more adhesive strips on the top and/or bottom side of the surface protector that include a releasable release liner.

In yet another and/or alternative non-limiting object of the present invention, there is provided a surface protector that includes one or more adhesive strips on the top and/or bottom side of the surface protector used to connect together an adjacently positioned surface protector to form a dust-proof or dust-resistant seal between the two adhesively connected surface protectors and, optionally, a liquid-proof or liquid-resistant barrier between the two adhesively connected surface protectors.

In still yet another and/or alternative non-limiting object of the present invention, there is provided a surface protector that includes one or more adhesive strips on the top and/or bottom side of the surface protector that are preapplied adhesive strips.

In yet another and/or alternative non-limiting object of the present invention, there is provided a surface protector that includes one or more creases on the top and/or bottom side of the surface protector.

In another and/or alternative non-limiting object of the present invention, there is provided a method for forming a surface protector that includes one or more preapplied adhesive strips on the top and/or bottom side of the surface protector.

In still another and/or alternative non-limiting object of the present invention, there is provided a surface protector that includes one or more creases on the top and/or bottom side of the surface protector that resist tearing or breaking along the crease when folded along the crease.

In still yet another and/or alternative non-limiting object of the present invention, there is provided a method for forming a creased surface protector that provides protection to floor and/or wall surfaces and which includes one or more adhesive strips.

In another and/or alternative non-limiting object of the present invention, there is provided a surface protector that includes one or more preapplied adhesive strips that can be easily connected to another surface protector so as to form a dust-proof or dust-resistant seal between the two adhesively connected surface protectors and, optionally, a liquid-proof or liquid-resistant barrier between the two adhesively connected surface protectors.

In still another and/or alternative non-limiting object of the present invention, there is provided a surface protector that includes one or more preapplied adhesive strips and one or more creases on the top and/or bottom side of the surface protector, and which said surface protector can be easily connected to another surface protector so as to form a dust-proof or dust-resistant seal between the two adhesively connected surface protectors, and optionally a liquid-proof or liquid-resistant barrier between the two adhesively connected surface protectors, and which surface protector can be bent along the one or more creases while not damaging the crease to provide protection to floor and/or wall surfaces.

These and other objects and advantages will become apparent to those skilled in the art upon reading and following the description taken together with the accompanying drawings.

BRIEF DESCRIPTION OF THE DRAWINGS

Reference may now be made to the drawings which illustrate various non-limiting embodiments that the invention may take in physical form and in certain parts and arrangement of parts wherein.

DETAILED DESCRIPTION OF THE NON-LIMITING EMBODIMENTS

Figure 1:
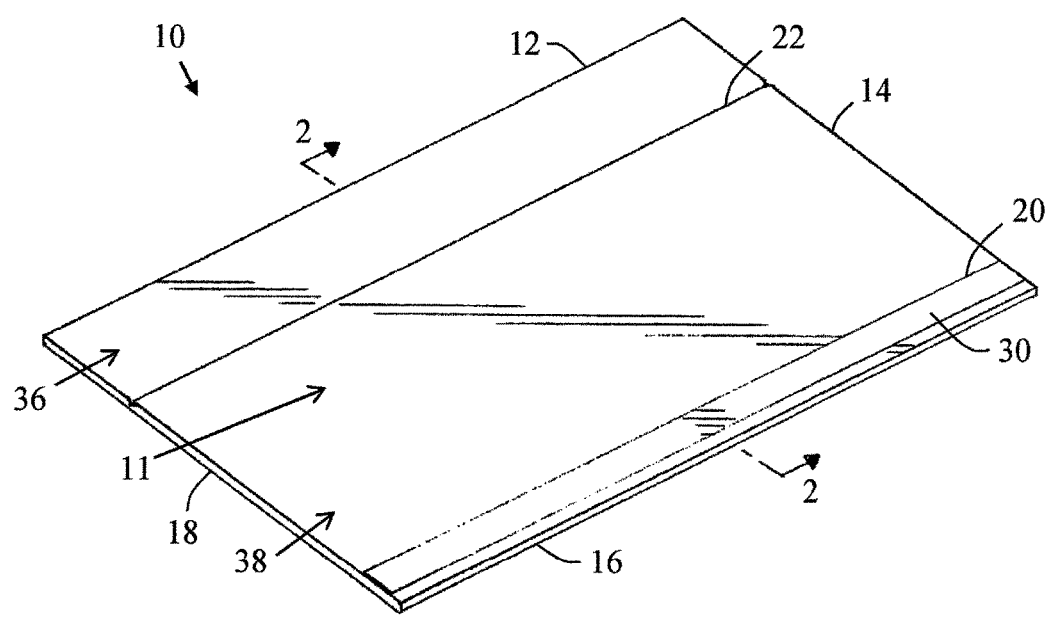
FIG. 1 is a top perspective view of a surface protector in accordance with one non-limiting aspect of the present invention.

Referring now to the drawings, wherein the showings are for the purpose of illustrating various non-limiting embodiments of the invention only and not for the purpose of limiting the same, the present disclosure provides a system and method for surface protection comprising a surface protector having one or more adhesive strips on the top and/or bottom surface of the surface protector which allow for a plurality of surface protectors and/or floor coverings to be connected together. This system thus eliminates the need for additional materials (e.g., tape, glue, etc.) at the jobsite to complete the installation of the surface protector. The surface protector can also optionally include one or more creases on the top and/or bottom surface of the surface protector.

Referring now to FIGS. 1-12, there is illustrated a surface protector 10 configured to protect selected portions of surfaces such as, for example, a floor F and/or a wall W. Generally, the surface protector 10 includes a sheet 11 of bendable material such as, for example, a paperboard material or a fiberboard material having a perimeter comprising edges 12, 14, 16, 18, a top surface 24 and a bottom surface 26. Additionally, the surface protector 10 includes one or more adhesive strips 20 on the top and/or bottom surface of the sheet. The adhesive strip 20 is illustrated as being positioned adjacent to one or more edges of sheet 11. As illustrated in FIGS. 1-4A, the surface protector includes a single adhesive strip positioned on the top surface 24 of sheet 11 and adjacent to and generally parallel to edge 16. As can be appreciated, the top surface and/or the bottom surface of sheet 11 can include one or more adhesive strips. As also can be appreciated, the adhesive strip can be located on edge 16 instead of being spaced from edge 16 as illustrated in FIGS. 1-4A. As can also be appreciated, one or more adhesive strips can be positioned on or adjacent to edge 12 of sheet 11.

As discussed above, the preapplied adhesive strip is illustrated as being spaced from edge 16; however, it can be appreciated that the adhesive strip can be positioned such that one side of the adhesive strip extends to edge 16.

Generally, the adhesive strip 20 is a preapplied adhesive strip having a top adhesive surface 32.

Figure 2:
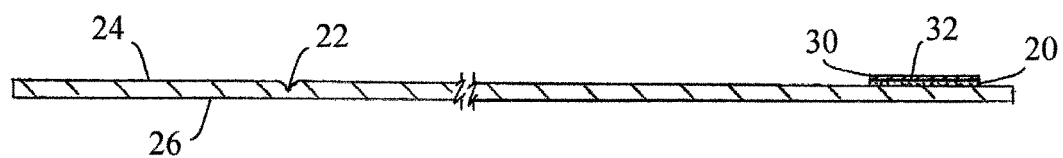
FIG. 2 is a cross-sectional view taken along 2-2 of FIG. 1.
Figure 3:
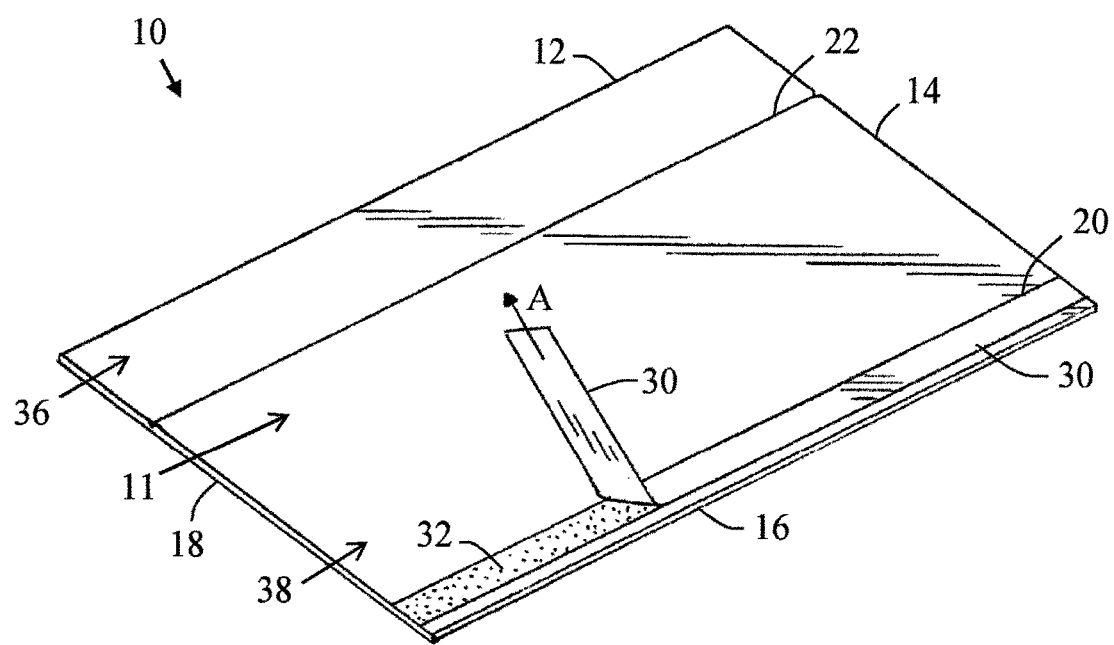
FIG. 3 is a top perspective view of the surface protector of FIG. 1 showing the removal of a removable top protective release liner.

As best illustrated in FIGS. 2-3, the adhesive strip 20 includes a removable top protective release liner 30 that fully covers the top surface of the adhesive strip. When the top protective release liner is removed from the top surface of the adhesive strip, as indicated by arrow A, the top adhesive surface 32 of the adhesive strip 20 is exposed and the adhesive strip is not damaged. The composition of the top adhesive surface 32 is non-limiting; however, it is typically selected to form a permanent connection or bond with another surface protector and/or floor covering. The thickness of the adhesive strip is non-limiting. Generally, the thickness is about 1 mill to 0.1 inch (and all values and ranges therebetween). The adhesive is generally formed of a flexible material such that when the surface protector is rolled into a roll and subsequently unrolled, the adhesive strip is not damaged. The top protective release liner generally has a thickness of about 5 mills to 0.1 inch (and all values and ranges therebetween). Generally, the thickness of the top protective release liner is greater than the thickness of the adhesive strip; however, this is not required. The top protective release liner is also generally formed of a flexible material such that when the surface protector is rolled into a roll and subsequently unrolled, the top protective release liner is not damaged and does not prematurely release from the top surface of the adhesive strip. Generally, the adhesive strip has a constant thickness and width along the length of the surface protector. The width of the adhesive strip is generally about 0.25-8 inches and typically about 0.5-3 inches; however other widths can be used. These features of the adhesive strips are also applicable to the adhesive strips illustrated in FIGS. 4-12.

It is to be appreciated that a section of a floor can become exposed between separated sheets of traditional floor coverings at job sites, thereby allowing dirt, debris, etc. to fall onto the floor and work their way underneath the floor coverings. The adhesive strip 20 applied to the surface protector 10 of the present invention is designed to prevent this separation of overlapped surface protectors, thereby preventing any relative movement between said surface protectors and inhibiting or preventing dirt, debris, etc. from falling thereunder. The adhesive strip can also be designed to optionally form a liquid-resistant or waterproof seal between the two connected surface protectors.

Figure 4:
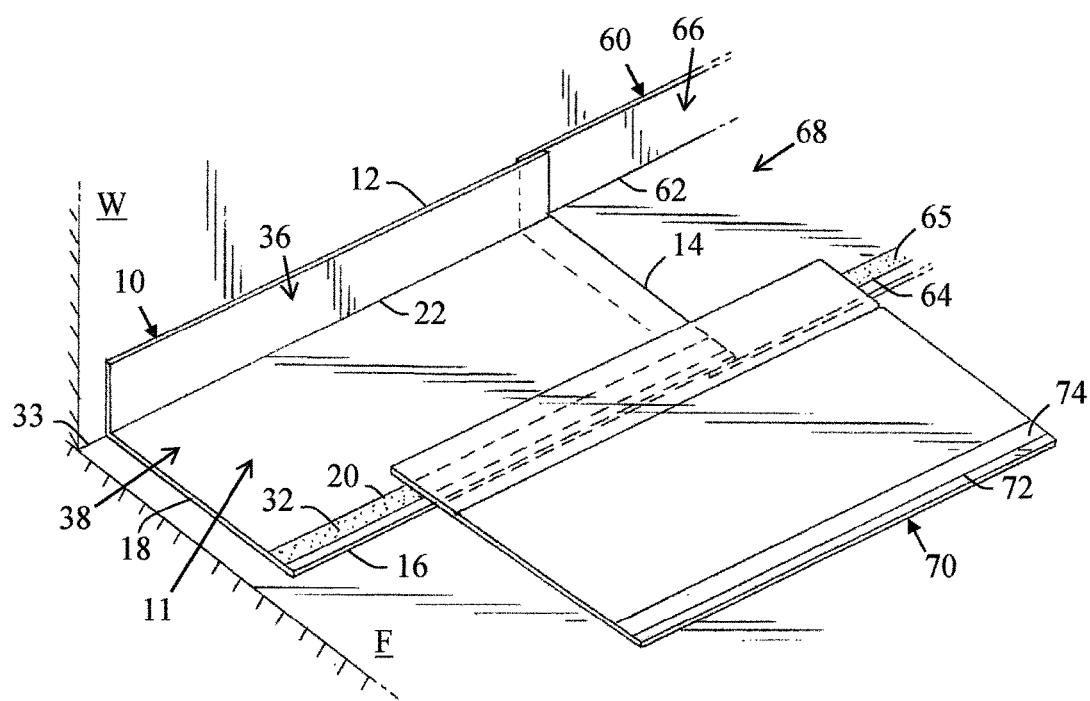
FIG. 4 is a perspective view of a plurality of surface protectors in the use position.
Figure 4A:
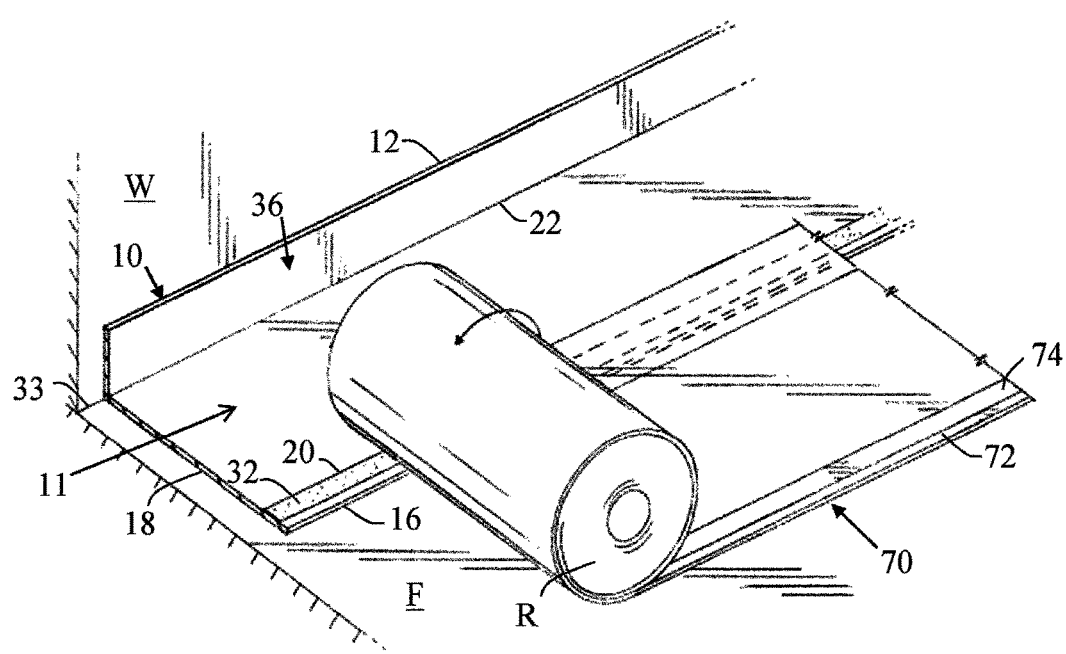
FIG. 4A is a perspective view of a plurality of surface protectors in the use position similar to FIG. 4 wherein the one or both surface protectors are laid from a roll of surface protector.

As best illustrated in FIGS. 4 and 4A, the top adhesive surface 32 of the adhesive strip 20 is capable of forming an adhesive bond with a portion of a second surface protector 70 positioned on or over the exposed top adhesive surface 32 of the adhesive strip 20. FIG. 4 illustrates two sheets 10, 70 of surface protector being connected together. FIG. 4A illustrates a roll R of surface protector 70 being unrolled and connected to a previously unrolled or previously placed sheet 10 of surface protector 70. The bond formed between the surface protector 10 and the surface protector 70 can be a dust-proof bond. Furthermore, the bond formed between the surface protector 10 and the surface protector 70 can optionally be a liquid-proof bond. In combination with the water-resistant nature of sheet 11 of the surface protector 10, there is provided a substantially dust-proof and optional liquid-proof surface protection system as illustrated in FIGS. 1-4A Generally, the adhesive bond formed between two surface protectors is designed to be a permanent bond. As such, breaking of the adhesive bond (i.e., separating the two connected surface protectors) will lead to damage to one or both of the surface protectors connected by the adhesive bond and/or damage to the adhesive strip. For example, when the two surface protectors are separated from on another after being previously connected together by the adhesive strip and the sheets are formed of a paperboard or fiberboard material, a layer of fiberboard material or paperboard material is generally left behind on the top adhesive surface of the adhesive strip; however, this is not required. Additionally, breaking of the adhesive bond can compromise the dust-proof seal and/or optional liquid-proof seal created by the adhesive bond.

In current floor protection systems, a user must get on his/her knees and cut and paste adhesive tape over the seams between adjacent floor coverings. Such a process is time consuming, can be difficult and painful for individuals that have arthritis or bad knees and joints, and a proper connection or seal may not be formed between the adjacent floor coverings. The present invention provides a surface protector floor covering that is easy to use, which is capable of protecting a surface (e.g., floor F) against sharp and forceful impact, and which can be easily connected together.

Any number of adhesive strips 20 can be positioned on the top and/or bottom surface of sheet 11 of surface protector 10. When one or more of the adhesive strips run along the longitudinal length of the sheet, the one or more adhesive strips are generally aligned with and run generally parallel to sides 12, 16, of the sheet of the surface protector. One or more adhesive strips can be positioned on side 12 and/or one side 16. One or more of the adhesive strips can be positioned on or spaced from side 12 and/or one side 16. If two of more adhesive strips are positioned on one or both sides of the sheet, the adjacently positioned adhesive strips can optionally be positioned next to and touch one another or be spaced some distance from one another. The adhesive strips can be positioned on only the top surface of the sheet, only the bottom surface of the sheet, or on both the top and bottom surface of the sheet. If one or more adhesive strips are located on the top and bottom surface of the sheet of the surface protector, one or more of the adhesive strips can be used to connect to another surface protector, connect to a floor surface, connect to nothing, etc. For example, the one or more adhesive strips can be used to connect one floor protector to the front and/or back ends of the sheet, and/or to one or both sides of the sheet. In another example, the one or more adhesive strips can be used to connect the floor protector to a floor surface and/or a wall surface. In another example, the one or more adhesive strips can be used to connect the floor protector to a floor surface and/or a wall surface, and one or more adhesive strips can be used to connect one floor protector to the front and/or back ends of the sheet, and/or to one or both sides of the sheet.

As discussed above, FIGS. 1-4A illustrate a single adhesive strip 20 positioned on top surface 24 and adjacent to side 16 along and generally parallel to side 16 of sheet 11. As can be appreciated, the surface protector can be modified to include any of the features of the surface protectors described below and illustrated in FIGS. 6-12.

Figure 6:
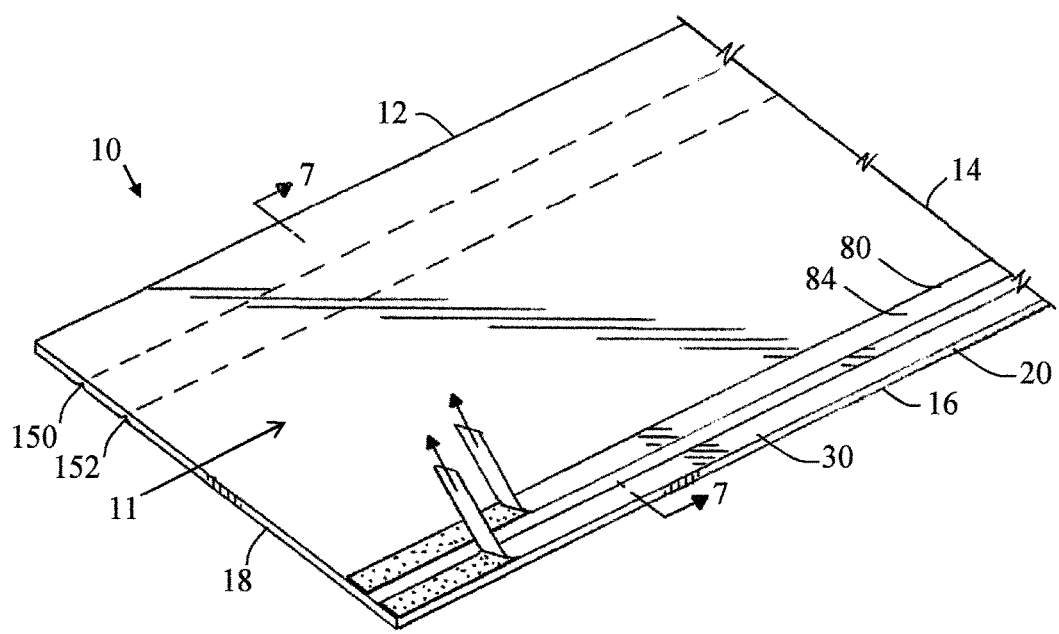
FIG. 6 is a top perspective view of a surface protector in accordance with another non-limiting aspect of the present invention.
Figure 7:
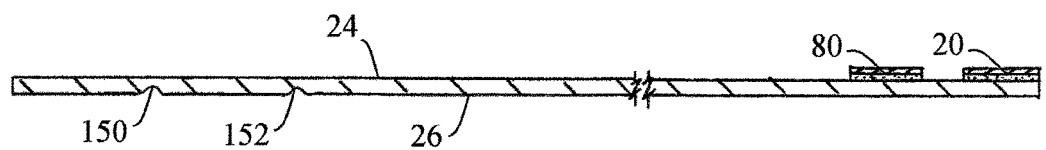
FIG. 7 is a cross section view along line 7-7 of FIG. 6.

As illustrated in FIGS. 6 and 7, surface protector 10 is formed of sheet 11 that includes two adhesive strips 20, 80 that are positioned on top surface 24 and located on or near edge 16 of sheet. Adhesive strips 20, 80 are located closer to edge 16 than to edge 18. Adhesive strip 20 is positioned on edge 16 and adhesive strip 80 is positioned adjacent and spaced from adhesive strip 20. As can be appreciated, adhesive strip 20 can be spaced from edge 16. As can also be appreciated, adhesive strip 80 can optionally be located next to and in contact with an edge of adhesive strip 20. Adhesive strips 20 and 80 are illustrated as having generally the same width; however, this is not required. Adhesive strips 20 and 80 are illustrated as running generally parallel to one another along the longitudinal length of sheet 11; however, this is not required. The composition and thickness of the adhesive of the two adhesive strips are generally the same; however, this is not required. Likewise, the composition and thickness of the removable top protective release liner 30, 84 are generally the same; however, this is not required.

Figure 8:
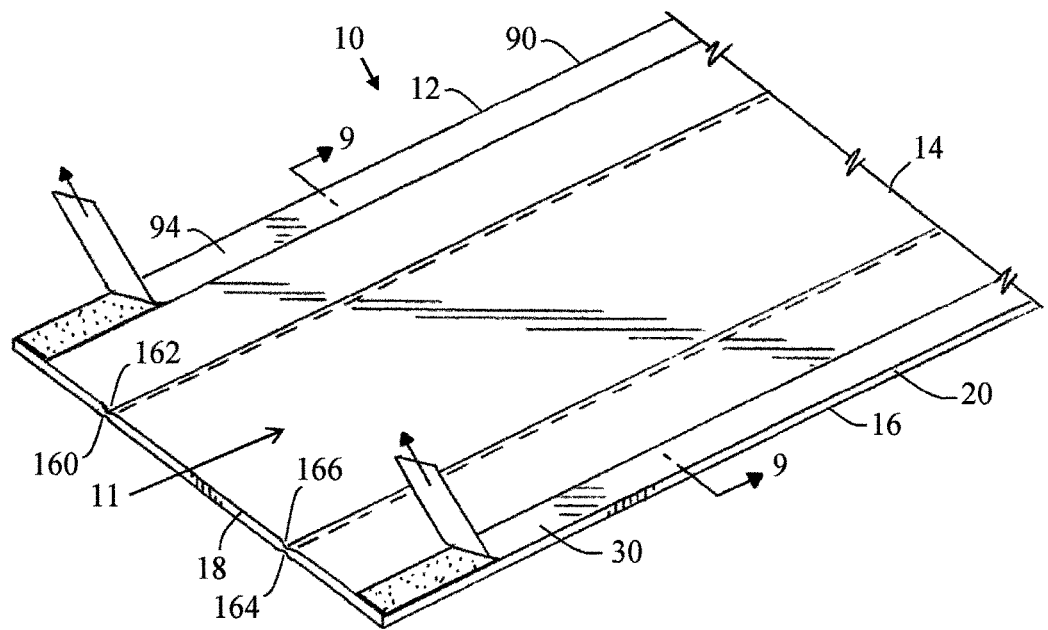
FIG. 8 is a top perspective view of a surface protector in accordance with another non-limiting aspect of the present invention.
Figure 9:
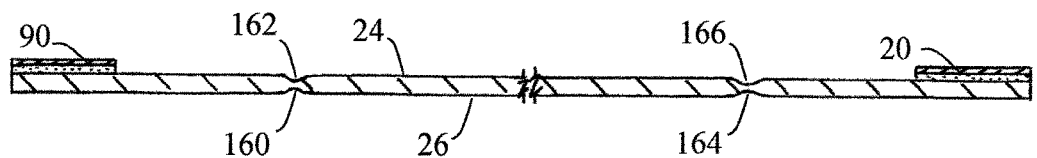
FIG. 9 is a cross section view along line 9-9 of FIG. 8.

As illustrated in FIGS. 8 and 9, surface protector 10 is formed of sheet 11 that includes two adhesive strips 20, 90 positioned on top surface 24 and wherein adhesive strip 20 is located on edge 16 of the sheet and adhesive strip 90 is located on edge 12. As can be appreciated, adhesive strip 20 can optionally be spaced from edge 16 and the adhesive strip can be located on edge 12. As can also be appreciated, adhesive strip 20 can optionally be on edge 16 and the adhesive strip can be spaced from edge 12. As can also be appreciated, adhesive strip 20 can be spaced from edge 16 and the adhesive strip can be spaced from edge 12. Adhesive strips 20 and 90 are illustrated as having generally the same width; however, this is not required. Adhesive strips 20 and 90 are illustrated as running generally parallel to one another along the longitudinal length of sheet 11; however, this is not required. The composition and thickness of the adhesive of the two adhesive strips are generally the same; however, this is not required. Likewise, the composition and thickness of the removable top protective release liner 30, 94 are generally the same; however, this is not required.

Figure 10:
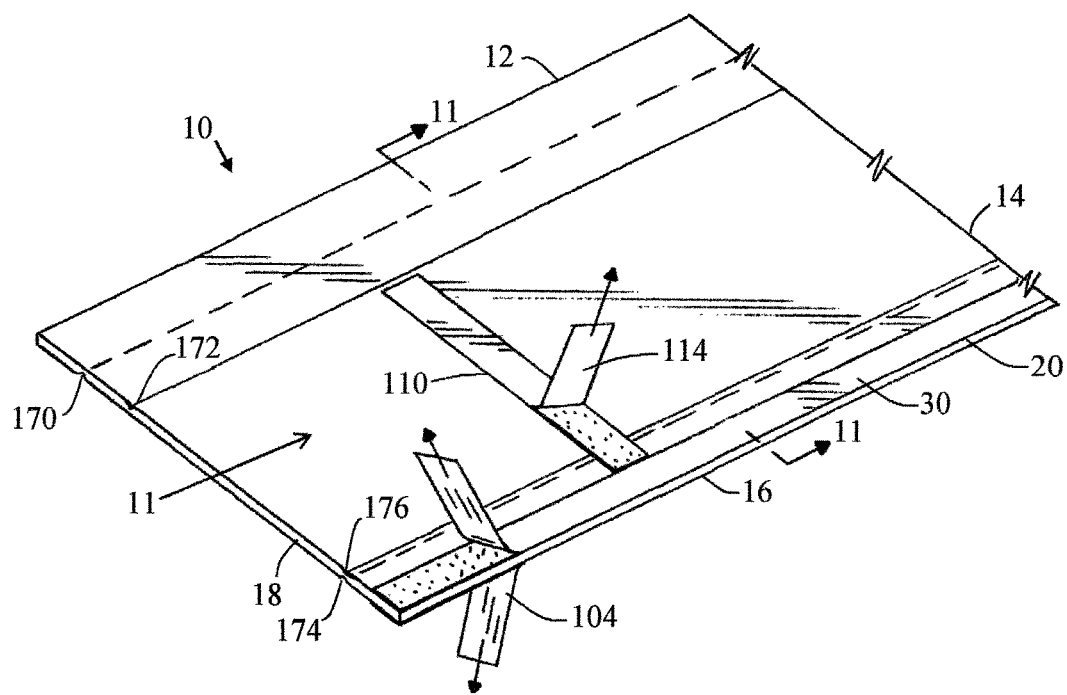
FIG. 10 is a top perspective view of a surface protector in accordance with another non-limiting aspect of the present invention.
Figure 11:
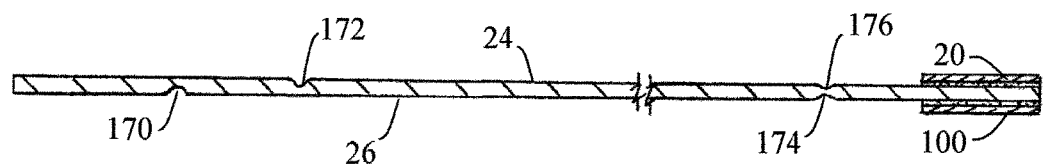
FIG. 11 is a cross section view along line 11-11 of FIG. 10.

As illustrated in FIGS. 10 and 11, surface protector 10 is formed of sheet 11 that includes adhesive strips 20, 100 positioned wherein adhesive strip 20 is located on the top surface 24 of sheet 11 and on edge 16 of the sheet and adhesive strip 100 is located on the bottom surface 26 of sheet 11 and on edge 16. Adhesive strips 20, 100 are illustrated as being located on the direct opposite sides of sheet 11; however, this is not required. As can be appreciated, adhesive strip 20 can optionally be spaced from edge 16 and the adhesive strip can be located on edge 16 or vice versa. Adhesive strips 20 and 100 are illustrated as having generally the same width; however, this is not required. Adhesive strips 20 and 100 are illustrated as running generally parallel to one another along the longitudinal length of sheet 11; however, this is not required. The composition and thickness of the adhesive of the two adhesive strips are generally the same; however, this is not required. Likewise, the composition and thickness of the removable top protective release liner 30, 104 are generally the same; however, this is not required. As can be appreciated, one or more adhesive strips can optionally also or alternatively be positioned on or adjacent to edge 12 on the top and/or bottom surface of sheet 11.

In addition to the adhesive strips running along the longitudinal length of sheet 11, the top surface 24 of sheet 11 includes one or more adhesive strips 110 that run between side edges 12, 16. Adhesive strip 110 is illustrated as having one end in contact with adhesive strip 20 and the other edge being spaced from edge 12. As can be appreciated, the end of the adhesive strip nearest adhesive strip 20 can optionally be spaced from adhesive strip 20 or extend partially or fully over or under adhesive strip 20 to be close to or extend to edge 16. As can also be appreciated, the end of adhesive strip 110 that is closest to edge 12 can optionally extend to edge 12. Also, it can be appreciated that adhesive strip 110 can optionally also or alternatively be positioned on the bottom side 26 of sheet 11. When the sheet of the surface protector includes a plurality of adhesive strips 110, the adhesive strips 110 are generally spaced about 0.5 ft.-20 ft. and all values and ranges therebetween from one another along the longitudinal axis of the sheet. When a plurality of adhesive strips 110 are positioned on sheet 11, the adhesive strips run generally parallel to one another; however, this is not required. Also, when a plurality of adhesive strips 110 are positioned on sheet 11, the adhesive strips have generally the same shape length, width, and thickness, and the composition of the adhesive is generally the same; however, this is not required. Likewise, the composition and thickness of the removable top protective release liners 30, 104, 114 are generally the same; however, this is not required. The composition, width and thickness of the adhesive of the one or more adhesive strips 110 are generally the same as the composition, width and thickness of the adhesive of adhesive strips 20, 100; however, this is not required. Likewise, the composition and thickness of the removable top protective release liner 104 are generally the same as the composition and thickness of the removable top protective release liner 30; however, this is not required.

Figure 5:
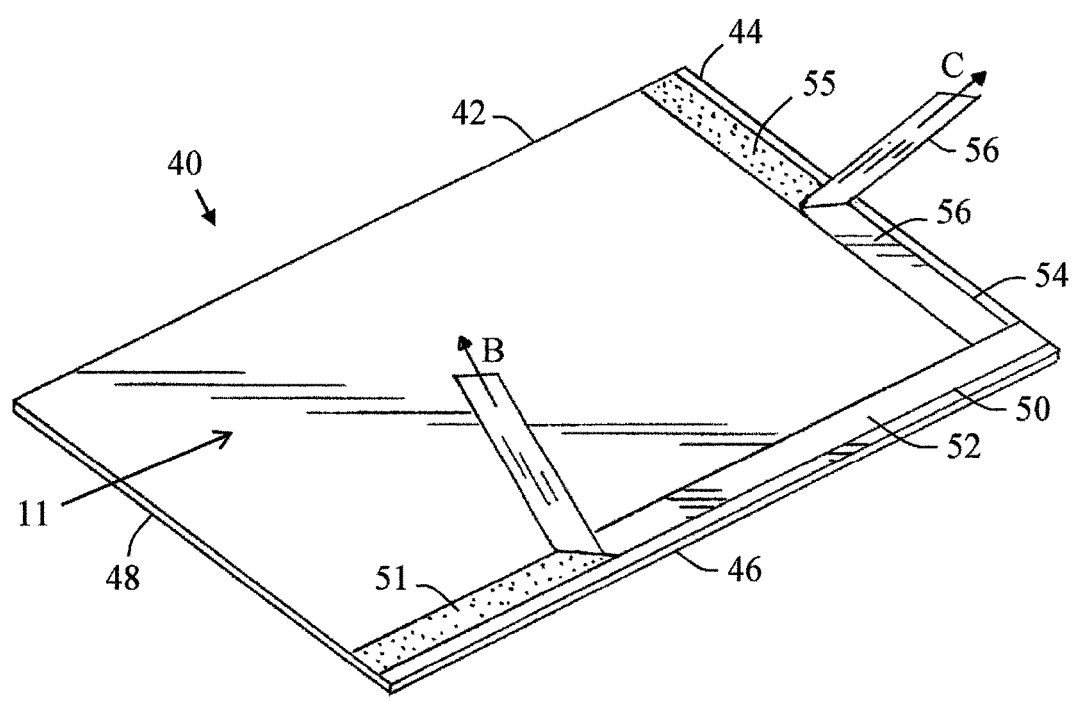
FIG. 5 is a top perspective view of a surface protector in accordance with another and/or alternative non-limiting aspect of the present invention.

With reference now to FIG. 5, there is provided a perspective illustration of a surface protector 10 comprising a sheet 11 wherein adhesive strip 20 is located adjacent to edge 16 and adhesive strip 50 is located adjacent to edge 14. Both adhesive strips are located on the top surface of sheet 11. Adhesive strip 50 is illustrated as running fully from edge 12 to edge 16; however, this is not required. As can be appreciated, adhesive strip 20 can optionally be positioned on the bottom side of sheet 11. As can also be appreciated, sheet 11 can optionally include both adhesive strip 50 on the top surface and another adhesive strip on the bottom surface that is also located on or adjacent to edge 14 and runs generally parallel to adhesives strip 50; however, this is not required. As also be appreciated, a plurality of adhesive strips can be optionally positioned on the top and/or bottom surface of sheet 11 that run partially or fully between edges 12 and 14 and which run generally parallel to one another and which are located at or near edge 14. Although no shown, it can be appreciated that one or more adhesive strips can optionally be positioned on the top and/or bottom surface of sheet 11 that run partially or fully between edges 12 and 14 and which run generally parallel to one another and which are located at or near edge 18. Adhesive strip 50 is illustrated as running generally normal or perpendicular to adhesive strip 20; however, this is not required. Adhesive strips 20, 50 are generally the same shape length, width, and thickness, and the composition of the adhesive is generally the same; however, this is not required. Likewise, the composition and thickness of the removable top protective release liner 30, 56 are generally the same; however, this is not required. The composition, width and thickness of the adhesive of the one or more adhesive strips are generally the same; however, this is not required. Likewise, the composition and thickness of the removable top protective release liners are generally the same; however, this is not required. When the removable protective release liner 30 is removed from the adhesive strip 20 (as indicated by arrow B), the top adhesive surface 32 of adhesive strip 50 is exposed. Similarly, when the removable protective release liner 56 is removed from the adhesive strip 50 (as indicated by the arrow C), the top adhesive surface 52 of adhesive strip 50 is exposed. In practice, adhesive strip 50 that is positioned at edge 14 and/or edge 18 can be used to connect together the front and/or back ends of two sheets so that surfaces that are longer than the length of a single sheet 11 can be protected by multiply connected sheets of surface protector.

Figure 12:
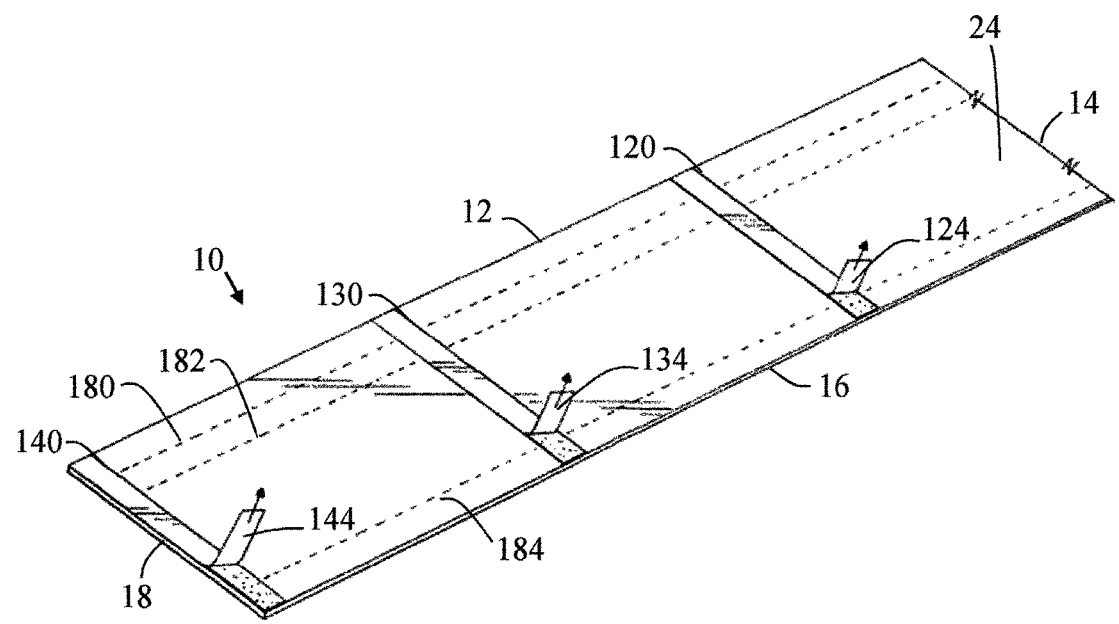
FIG. 12 is a top perspective view of a surface protector in accordance with another non-limiting aspect of the present invention.

Referring now to FIG. 12, there is illustrated a surface protector 10 that includes a sheet wherein the top surface includes a plurality of adhesive strips 120, 130, 140 that run between edges 12 and 16 of sheet 11. Adjacently positioned adhesive strips are generally spaced equal distances from one another; however, this is not required. The composition, width and thickness of the adhesive of the one or more adhesive strips are generally the same; however, this is not required. Likewise, the composition and thickness of the removable top protective release liners 124, 134, 144 are generally the same; however, this is not required. Although not shown, it can be appreciated that the bottom surface or the top and bottom surface of sheet 11 can optionally include a plurality of adhesive strips that run between edges 12 and 16 of sheet 11. As can also be appreciated, the top and/or bottom surface of the sheet can optionally include one or more adhesive strips that are positioned on or adjacent to edge 12 and/or edge 16 and run generally parallel to edge 12 and/or edge 16.

The different spacing and positioning arrangements of the one or more adhesive strips relative to one or both sides of the sheet of the surface protector and the top and/or bottom surface of the sheet of the surface protector allows for custom connecting to ensure adequate protection for a selected portion of a surface to be protected by the surface protector. It can be appreciated that any number of surface protectors can be utilized in conjunction with one another wherein adjacent surface protectors are overlapped, and an adhesive bond is formed between top and bottom surfaces of said adjacent surface protectors. The surface protectors can optionally be used to completely cover a floor surface. As such, during job site operations, relative movement between adjacent surface protectors is minimized or eliminated by the adhesive bond formed between said adjacent surface protectors. As can be appreciated, the arrangement, number and positioning of the adhesive strips on sheet 11 as illustrated in FIGS. 1-12 are non-limiting, and the present invention contemplates the number, configuration and arrangement of adhesive strips on the top and/or bottom surface of sheet 11. As can be appreciated, any of the arrangements of the adhesive strips described and illustrated in any one of FIGS. 1-12 can optionally be used in any of the other arrangements illustrated in FIGS. 1-12.

As illustrated in FIGS. 1-4A and 6-12, the surface protector 10 can optionally include one or more creases that are offset a distance inward from an edge of sheet 11 of the surface protector 10. FIGS. 1-3 illustrate a single crease 22 on the top surface 24 of sheet 11 that is located closer to edge 12 than to edge 16. Crease 22 is illustrated as running along the longitudinal length of sheet 11. Crease 22 is generally positioned parallel to edge 12; however, this is not required.

Figure 3A:
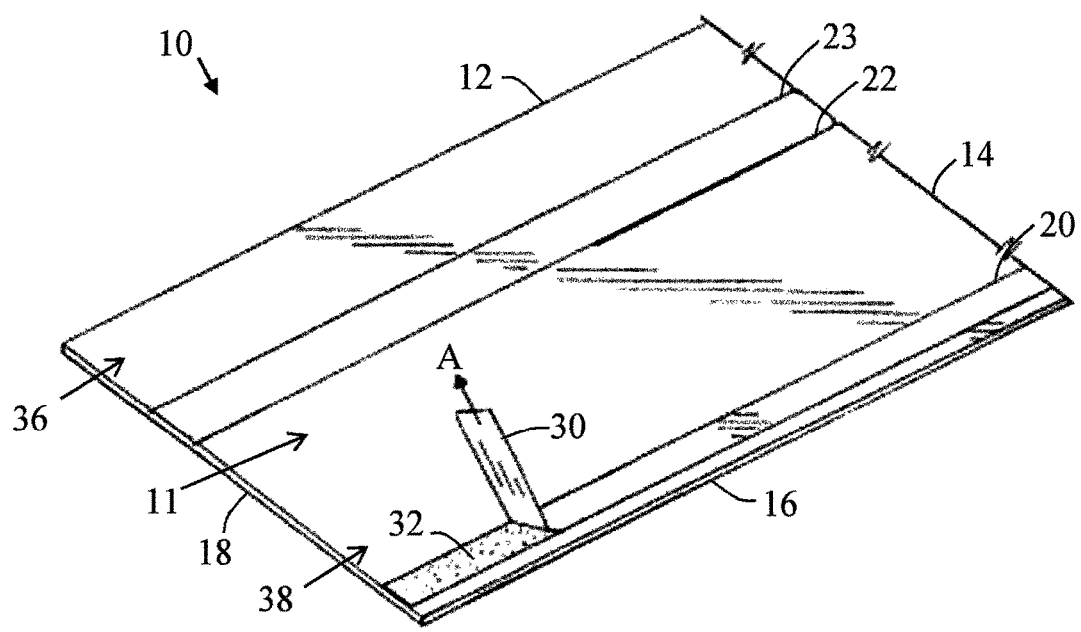
FIG. 3A is a top perspective view of a surface protector similar to FIG. 3 showing a surface protector with two creases.

FIG. 3A illustrates a surface protector that optionally includes two creases 22, 23. Creases 22, 23 are located on the top surface 24 of sheet 11 and are both located closer to edge 12 than to edge 16. The spacing between crease 23 and edge 12 is illustrated as being greater than the spacing between creases 22, 23; however, this is not required. Creases 22, 23 are illustrated as running along the longitudinal length of sheet 11. Creases 22, 23 are generally positioned parallel to edge 12; however, this is not required. The size, shape, width and depth of the creases is generally the same; however, this is not required. The spacing between crease 22 and adhesive strip 20 is illustrated as being greater than the distance between adhesive strip 20 and edge 16.

Figure 3B:
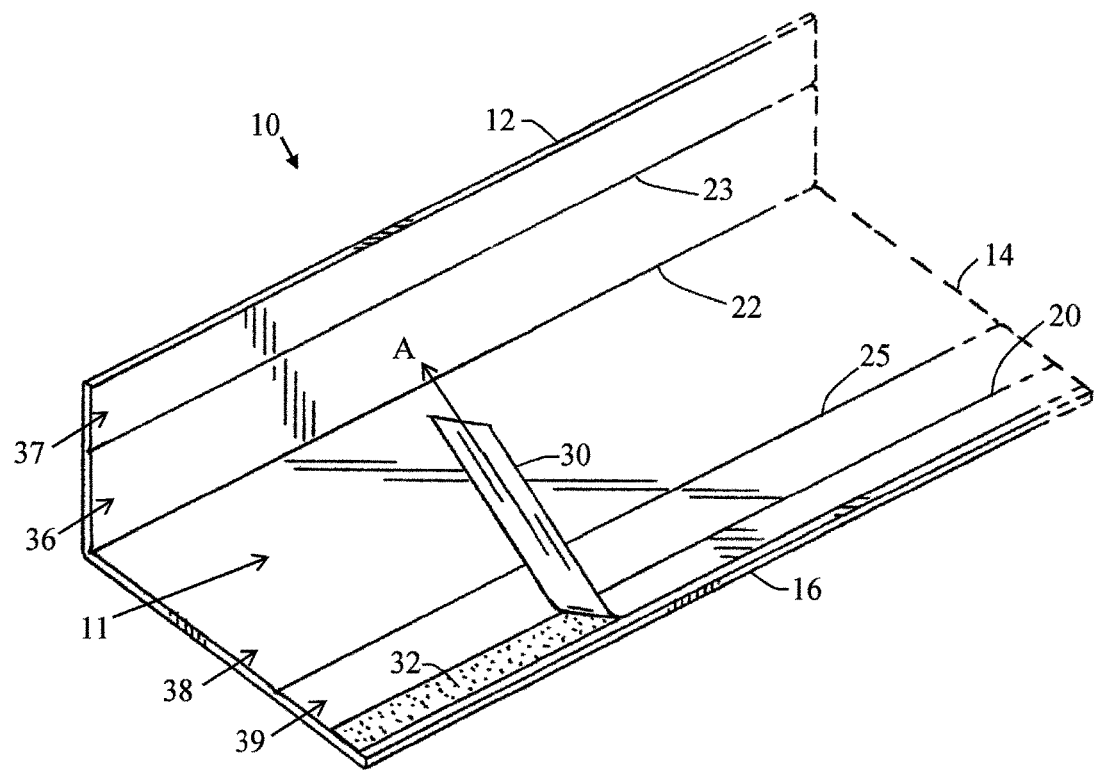
FIG. 3B is a top perspective view of a surface protector similar to FIG. 3 showing a surface protector with three creases.

FIG. 3B illustrates a surface protector that optionally includes three creases 22, 23, 25. Creases 22, 23, 25 are located on the top surface 24 of sheet 11. Both creases 22, 23 are located closer to edge 12 than to edge 16. Crease 25 is located closer to edge 16 than to edge 12. The spacing between crease 23 and edge 12 is illustrated as being less than the spacing between creases 22, 23; however, this is not required. The spacing between crease 25 and edge 16 is illustrated as being less than the spacing between crease 22 and edge 12 and greater than the distance between cease 23 and edge 12; however, this is not required. Creases 22, 23, 25 are illustrated as running along the longitudinal length of sheet 11. Creases 22, 23 are generally positioned parallel to edge 12 and crease 25 is generally positioned parallel to edge 16 and all three creases are generally positioned parallel to one another; however, this is not required. Crease 25 is also illustrated as being spaced a greater distance from edge 16 as compared to adhesive strip 20; however, this is not required. Crease 25 is also illustrated as being spaced from adhesive strip 20; however, this is not required. The size, shape, width and depth of the crease is generally the same; however, this is not required.

Referring now FIGS. 6 and 7, the surface protector includes a sheet 11 having two creases 150, 152. Creases 150, 152 are located on the bottom surface 26 of sheet 11. Both creases 150, 152 are located closer to edge 12 than to edge 16. The spacing between crease 150 and edge 12 is illustrated as being about the same as the spacing between creases 150, 152; however, this is not required. Creases 150, 152 are illustrated as running along the longitudinal length of sheet 11. Creases 150, 152 are generally positioned parallel to edge 12; however, this is not required. The size, shape, width and depth of the creases are generally the same; however, this is not required. Crease 150, 152 are illustrated as being positioned on the opposite side of sheet 11 than the adhesive strips 20, 80. The spacing between the two adhesive strips 20, 80 is illustrated as being less than the spacing between creases 150, 152; however, this is not required.

Referring now to FIGS. 8 and 9, the surface protector includes a sheet 11 having four creases 160, 162, 164, 166. Creases 160, 164 are located on the bottom surface 26 of sheet 11 and creases 162, 166 are located on the top surface 24 of sheet 11. Both creases 160, 162 are located closer to edge 12 than to edge 16. Both creases 164, 166 are located closer to edge 16 than to edge 12. Crease 162 is illustrated as being positioned directly above crease 160 and spaced the same distance from edge 12 as crease 160; however, this is not required. Crease 166 is illustrated as being positioned directly above crease 164 and spaced the same distance from edge 16 as crease 164; however, this is not required. The spacing between creases 160, 162 and edge 12 is illustrated as being about the same as the spacing between creases 164, 166 from edge 16; however, this is not required. Creases 160, 162, 164, 166 are illustrated as running along the longitudinal length of sheet 11. Creases 160, 162 are generally positioned parallel to edge 12; however, this is not required. Creases 164, 166 are generally positioned parallel to edge 16; however, this is not required. Generally, all of the creases are positioned parallel to one another. The size, shape, width and depth of the creases are generally the same; however, this is not required. Creases 160, 164 are illustrated as being positioned on the opposite side of sheet 11 that the adhesive strips 20, 90, and creases 162, 166 are illustrated as being positioned on the same side of sheet 11 as the adhesive strips 20, 90. The spacing between adhesive strip 90 and edge 12 is illustrated as being less than the spacing of creases 160, 162 from edge 12; however, this is not required. The spacing between adhesive strip 20 and edge 16 is illustrated as being less than the spacing of creases 164, 166 from edge 16; however, this is not required.

Referring now to FIGS. 10 and 11, the surface protector includes a sheet 11 having four creases 170, 172, 174, 176. Creases 170, 174 are located on the bottom surface 26 of sheet 11 and creases 172, 176 are located on the top surface 24 of sheet 11. Both creases 170, 172 are located closer to edge 12 than to edge 16. Both creases 174, 176 are located closer to edge 16 than to edge 12. Crease 172 is illustrated as being positioned a greater distance from edge 12 than 170; however, this is not required. Crease 176 is illustrated as being positioned directly above crease 174 and spaced the same distance from edge 16 as crease 174; however, this is not required. The spacing between crease 170 and edge 12 is illustrated as being about the same as the spacing between creases 174, 176 from edge 16; however, this is not required. Creases 170, 172, 174, 176 are illustrated as running along the longitudinal length of sheet 11. Creases 170, 172 are generally positioned parallel to edge 12; however, this is not required. Creases 174, 176 are generally positioned parallel to edge 16; however, this is not required. Generally, all of the creases are positioned parallel to one another. The size, shape, width and depth of the creases are generally the same; however, this is not required. Creases 170, 174 are illustrated as being positioned on the opposite side of sheet 11 than the adhesive strip 20, and creases 172, 176 are illustrated as being positioned on the same side of sheet 11 as the adhesive strip 20. Creases 170, 174 are illustrated as being positioned on the same side of sheet 11 as the adhesive strip 100, and creases 172, 176 are illustrated as being positioned on the opposite side of sheet 11 than the adhesive strip 100. The spacing between adhesive strips 20, 100 and edge 16 is illustrated as being less than the spacing of creases 174, 176 from edge 16; however, this is not required. One end of adhesive strip 110 is illustrated as terminating just prior to crease 172; however, this is not required. The opposite end of adhesive strip 110 is illustrated as overlying crease 176 and extending to or adjacent to adhesive strip 20. As can be appreciated, adhesive strip 110 can be sized and positioned so as to not overlie any of the creases on sheet 11; however, this is not required.

Referring now to FIG. 12, the surface protector includes a sheet 11 having three creases 180, 182, 184. Creases 180, 182, 184 are located on the bottom surface 26 of sheet 11. Both creases 180, 182 are located closer to edge 12 than to edge 16. Crease 184 is located closer to edge 16 than to edge 12. Crease 182 is illustrated as being positioned a greater distance from edge 12 than 180; however, this is not required. The spacing between crease 180 and edge 12 is illustrated as being about the same as the spacing between crease 184 and edge 16; however, this is not required. Creases 180, 182, 184 are illustrated as running along the longitudinal length of sheet 11. Creases 180, 182 are generally positioned parallel to edge 12; however, this is not required. Crease 184 is generally positioned parallel to edge 16; however, this is not required. Generally, all of the creases are positioned parallel to one another. The size, shape, width and depth of the creases are generally the same; however, this is not required. Creases 180, 182, 184 are illustrated as being positioned on the opposite side of sheet 11 than the adhesive strips 120, 130, 140. Creases 180, 182, 184 are illustrated as being generally normal or perpendicular to adhesive strips 120, 130, 140; however, this is not required.

As can be appreciated, the number and orientation of creases, and the side of the sheet upon which the one or more creases can be located, is non-limiting. FIGS. 1-4A and 6-12 merely provide a few examples of the number and orientation of creases, and the side of the sheet upon which the one or more creases can be located in combination with the one or more adhesive strips that can be located on the top and/or bottom surface of the sheet. As can be appreciated, any of the arrangements of the creases described and illustrated in any one of FIGS. 1-4A and 6-12 can optionally be used in any of the other arrangements illustrated in FIGS. 1-12.

Referring now to FIGS. 4 and 4A, one example of the folding of the sheet along a crease and the connection of two surface protectors by use of the adhesive strip is illustrated. It will be appreciated that the general principles of using the surface protector as illustrated in FIGS. 4 and 4A can be used for the surface protectors illustrated in FIGS. 1-3 and 6-12. As illustrated in FIGS. 4 and 4A, the surface protector 10 can be folded along the one or more creases. As illustrated in FIGS. 4 and 4A, when the sheet is folded along crease 22, a first portion 36 and a second portion 38 of the sheet are formed. The first portion 36 of the surface protector 10 is capable of protecting a first surface (e.g., wall W) while the second portion 38 of surface protector 10 is capable of protecting a second surface (e.g., floor F) as illustrated in FIGS. 4 and 4A. Generally, the crease is designed to be water resistant when in the bent and non-bent state.

It is to be appreciated that the lower section of wall W as illustrated in FIGS. 4 and 4A, including the baseboard (not shown), can be easily damaged at job sites. The one or more creases of the surface protector 10 are designed to enable the surface protector to protect both the floor F and the lower section of the wall W at the same time, with a single piece of material. More specifically, the surface protector 10 is designed to prevent damage at or near the junction 33 between the floor F and the wall W.

The surface protector 10 of the present invention can be manufactured as a roll of material; however, this is not required. When the surface protector is in roll form, the end user can create sheets of foldable material of desired length to cover a selected surface by cutting the sheet to a desire length after being unrolled from the roll. Generally, during manufacturing, the adhesive strip 20 can be continuous applied to the sheet as the sheet is moved along a manufacturing process. If the surface protector is to be rolled into a roll, the removable top protective release liner is applied to the top surface of the adhesive of the adhesive strip prior to rolling the surface protector.

In use, the surface protector 10 can be unrolled as illustrated in FIG. 4A and positioned on a surface (e.g., floor F, wall W) to be covered and/or protected. The surface protector 10 can optionally be folded along one or more creases (e.g., crease 22) thereby forming a first portion 36 for covering a portion of the wall W and a second portion 38 for covering a portion of the floor F. When the surface protector is to be used to protect both a wall and a floor surface, the surface protector 10 is positioned such that one of the creases is positioned at or near the junction 33 between the floor F and wall W. The removable top protective release liner can be removed from the top adhesive surface of the adhesive strip, thereby exposing the top adhesive surface of the adhesive strip on the surface protector 10. A second surface protector 70 (see FIGS. 4 and 4A) can then be provided, unrolled and subsequently positioned such that the second surface protector 70 at least partially covers the exposed top adhesive surface of the adhesive strip of the surface protector 10. Generally, the second surface protector 70 is overlapped such that the overlapping portion of the second surface protector 70 at least partially covers the adhesive surface. A pressure such as, for example, the weight of a person walking on the surface protector, moving or rolling a roller on the surface protector, moving a heavy device (e.g., a device weighing 10 lbs. or more) on the surface protector, etc., can then be applied to the top surface of the surface protector 70 in the area of the adhesive strip on the top surface of the surface protector 10, thereby completing the adhesive bonding between the surface protector 10 and surface protector 70. This process can then be repeated to secure additional surface protectors together.

As illustrated in FIG. 4, a plurality of surface protectors 10, 60, 70 can be used to protect selections of surfaces (e.g., floor F and wall W). As illustrated in FIG. 4, surface protectors 10, 60 can be folded along one or more creases (e.g., 22, 62), respectively, and positioned such that the creases (e.g., 22, 62) are positioned at or near the junction 33 between the floor F and the wall W. As such, a first portion 36 of surface protector 10 can cover a portion of the wall W and a second portion 38 of surface protector 10 can cover a portion of the floor F. Similarly, a first portion 66 of surface protector 60 can cover a portion of the wall W and a second portion 68 of surface protector 60 can cover a portion of the floor F. Surface protector 10 overlaps surface protector 60. The removable protective release liners (not shown) can be removed from adhesive strips (e.g., adhesive strips 20, 64), thereby exposing the top adhesive surfaces (e.g., top adhesive surfaces 32, 65), respectively. Another surface protector 70 can then be positioned over the exposed adhesive surfaces of surface protectors 10, 60, respectively. As illustrated in FIG. 4, if surface protector 70 is the last surface protector to be added for protection of the selected surface, the removable protective release liner 74 is typically left in place over adhesive strip 72, thereby preventing exposure of the covered top adhesive material (not shown) of adhesive strip 72. At any point during installation, a pressure such as, for example, the weight of a person walking on the surface protector, can then be applied to the top surface of the surface protectors 10, 60, 70 in the area of the adhesive strips, thereby completing the adhesive bonding between the surface protectors 10, 60, 70. This process can then be repeated to secure additional surface protectors together.

Alternatively, the surface protector 70 can be provided, unrolled and positioned at least partially over the surface protector 10 prior to the removal of the removable top protective release liner (e.g., protective release liner 30) from the top adhesive surface (e.g., top adhesive surface 32) of the adhesive strip (e.g., adhesive strip 20) of the surface protector 10. In such a method of operation, the amount of dust, debris, etc. at the job site which sticks to the top adhesive surface of the adhesive strip before the second surface protector is applied can be minimized and/or prevented. As can be appreciated, this method of operation can be particularly useful in job operations having high dust, dirt, and/or debris production.

The adhesive bond formed between the surface protector 70 and the surface protector 10 can be a dust-proof bond. Additionally, the adhesive bond formed between the surface protector 70 and the surface protector 10 can be a liquid-proof bond.

It is to be appreciated that the surface protector 10 of the present invention can be used in conjunction with existing types of surface protectors and/or floor coverings (e.g., plastic sheets, cardboard, fiberboard, cloth, etc.) for the purpose of protecting selected portions of surfaces.

It is also to be appreciated that a plurality of surface protectors 10 can be used to completely cover the floor and at least a lower portion of one or more walls at a job site.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed:

1. A method for protecting selected portions of a floor surface, the method including:
   providing a first surface protector, said first surface protector is formed of a sheet of bendable material having a perimeter, top surface and a bottom surface; a first adhesive strip positioned at or adjacent to said perimeter of said sheet and positioned on said top surface or said bottom surface of said sheet, said first adhesive strip is a preapplied adhesive strip having a top adhesive surface; and said top adhesive surface forms an adhesive bond capable of connecting together an adjacently positioned surface protector,
      wherein said bendable material is one of fiberboard and paperboard;
   providing a second surface protector having a top surface and a bottom surface;
   positioning said first surface protector on said floor surface;
   positioning said second surface protector on said floor surface such that a portion of said bottom surface of said second surface protector overlies a portion of said first surface protector; and
   causing said first and second surface protectors to engage one another to cause said bottom surface of said second surface protector to adhesively connect to said top adhesive surface of said first adhesive strip on said first surface protector to form a permanent connection between said first and second surface protector and to form a dust-proof connection between said first and second surface protector.

2. The method as defined in claim 1, wherein said first adhesive strip on said first surface protector includes a removable top protective release liner that when removed exposes said top adhesive surface of said first adhesive strip, and further includes the step of removing said removable top protective release liner from a portion of said first adhesive strip prior to said bottom surface of said second surface protector to engage said portion of said first adhesive strip.

3. The method as defined in claim 1, wherein said step of causing said first and second surface protectors to engage one another includes applying pressure to said top surface of said second surface protector.

4. The method as defined in claim 3, wherein said step of applying pressure includes one or more processes selected from the group consisting of a) a person walking on said top surface of said second surface protector, b) rolling a roller over said top surface of said second surface protector, and c) moving a heavy device over said top surface of said second surface protector.

5. The method as defined in claim 1, wherein said second surface protector is formed of a sheet of bendable material having a perimeter, a top surface and a bottom surface; a first adhesive strip positioned at or adjacent to said perimeter of said sheet and positioned on said top surface or said bottom surface of said sheet, said first adhesive strip is a preapplied adhesive strip having a top adhesive surface; and said top adhesive surface forms an adhesive bond capable of connecting together an adjacently positioned surface protector.

6. The method as defined in claim 1, wherein said adhesive connection between said first and second surface protectors is a liquid-proof connection.

7. The method as defined in claim 1, wherein said second surface protector is different from said first surface protector, said second surface protector selected from the group consisting of: a plastic sheet, a cardboard sheet, a paperboard sheet, a fiberboard sheet, and a cloth sheet.

8. The method as defined in claim 1, wherein said first and second surface protectors are the same.

9. The method as defined in claim 1, wherein said first surface protector includes a first crease that is offset a distance inward from said perimeter of said sheet and positioned on said top surface or said bottom surface of said sheet, said sheet is capable of being folded along said first crease without damaging said crease or said sheet thereby creating a first portion and a second portion, said first portion of said sheet is capable of protecting a first surface and said second portion of said sheet is capable of protecting a second surface when said sheet is folded along said first crease.

10. The method as defined in claim 9, further including the step of folding said first surface protector along said first crease such that said first floor protector protects both a portion of said floor surface and a portion of a wall positioned adjacent to said floor surface.

11. The method as defined in claim 10, wherein said first crease is water-resistant both prior to and after said sheet is folded along said first crease.

12. The method as defined in claim 9, wherein said first crease is spaced a greater distance from said perimeter than said first adhesive strip.

13. The method as defined in claim 1, wherein said first surface protector has a longitudinal length of at least 10 feet and a width of at least 2 feet, and wherein said first surface protector is in a roll prior to being connected to said second surface protector, said first surface protector when in said roll is absent creases running between a width of said sheet when said sheet is rolled in said roll, and further includes the step of unrolling said first surface protector on said floor surface.

14. The method as defined in claim 1, wherein said first adhesive strip on said first surface protector runs parallel to a side edge of said sheet and along the longitudinal length of said sheet.

15. A method for protecting selected portions of a floor surface, the method including:
providing a first surface protector, said first surface protector including a sheet of bendable, water-resistant material having a perimeter, a substantially flat top surface, a substantially flat bottom surface, a first side, a second side which is parallel to said first side and extends along a longitudinal length of said sheet, a front edge, a back edge, and a first crease that is offset a distance inward from said first and second sides of said sheet and positioned on said substantially flat top surface or said substantially flat bottom surface of said sheet, said sheet is capable of being folded along said first crease to thereby create a first portion and a second portion without damaging said crease or said sheet and without compromising the water-resistant properties of the water-resistant material, said first crease is water-resistant both prior to and after said sheet is folded along said first crease, said first portion of said sheet is capable of protecting a first surface and said second portion of said sheet is capable of protecting a second surface when said sheet is folded along said first crease, said first surface protector having a first adhesive strip positioned at or adjacent to said perimeter of said sheet, said first adhesive strip is a preapplied adhesive strip having a top adhesive surface, said top adhesive surface forms an adhesive bond capable of connecting together an adjacently positioned surface protector;
providing a second surface protector having a substantially flat top surface and a substantially flat bottom surface;
positioning said first surface protector on said floor surface;
positioning said second surface protector on said floor surface such that a portion of said substantially flat bottom surface of said second surface protector overlies a portion of said first surface protector; and
causing said first and second surface protectors to engage one another to cause said bottom surface of said second surface protector to adhesively connect to said top adhesive surface of said first adhesive strip on said first surface protector to form a permanent connection between said first and second surface protector and to form a dust-proof connection between said first and second surface protector.

16. The method as defined in claim 15, wherein said first adhesive strip on said first surface protector includes a removable top protective release liner that when removed exposes said top adhesive surface of said first adhesive strip, and further including the step of removing said removable top protective release liner from a portion of said first adhesive strip prior to said bottom surface of said second surface protector to engage said portion of said first adhesive strip.

17. The method as defined in claim 15, wherein said step of causing said first and second surface protectors to engage one another includes applying pressure to said top surface of said second surface protector.

18. The method as defined in claim 17, wherein said step of applying pressure includes one or more processes selected from the group consisting of a) a person walking on said top surface of said second surface protector, b) rolling a roller over said top surface of said second surface protector, and c) moving a heavy device over said top surface of said second surface protector.

19. The method as defined in claim 15, wherein said sheet is a single piece of material selected from the group consisting of fiberboard, paperboard, composite fabric and plastic.

20. The method as defined in claim 19, wherein said sheet is fiberboard.

21. The method as defined in claim 15, wherein said second surface protector is formed of a sheet of bendable material having a perimeter, a top surface and a bottom surface; a first adhesive strip positioned at or adjacent to said perimeter of said sheet and positioned on said top surface or said bottom surface of said sheet, said first adhesive strip is a preapplied adhesive strip having a top adhesive surface; and said top adhesive surface forms an adhesive bond capable of connecting together an adjacently positioned surface protector.

22. The method as defined in claim 15, wherein said adhesive connection between said first and second surface protectors is a liquid-proof connection.

23. The method as defined in claim 15, further including the step of folding said first surface protector along said first crease such that said first floor protector protects both a portion of said floor surface and a portion of a wall positioned adjacent to said floor surface.

24. The method as defined in claim 15, wherein said first crease is spaced a greater distance from said perimeter than said first adhesive strip.

25. The method as defined in claim 15, wherein said first surface protector has a longitudinal length of at least 10 feet and a width of at least 2 feet, and wherein said first surface protector is in a roll prior to being connected to said second surface protector, said first surface protector when in said roll is absent creases running between a width of said sheet when said sheet is rolled in said roll, and further including the step of unrolling said first surface protector on said floor surface.

26. The method as defined in claim 15, wherein said first adhesive strip on said first surface protector runs parallel to a side edge of said sheet and along the longitudinal length of said sheet.

27. A method for protecting selected portions of a floor surface, the method including:
  providing a first surface protector, said first surface protector configured to protect selected portions of floor surfaces, said first surface protector comprising:
    a sheet of bendable, water-resistant material having a perimeter, a top surface, a bottom surface, a first side, a second side which is parallel to said first side and extends along a longitudinal length of said sheet, a front edge, a back edge, and a first crease that is offset a distance inward from said first and second sides of said sheet and positioned on said top surface or said bottom surface of said sheet, said sheet is capable of being folded along said first crease to thereby create a first portion and a second portion without damaging said crease or said sheet and without compromising the water-resistant properties of the water-resistant material, said first portion of said sheet is capable of protecting a first surface and said second portion of said sheet is capable of protecting a second surface when said sheet is folded along said first crease, said sheet is selected from the group consisting of fiberboard, paperboard, composite fabric and plastic;
    a first adhesive strip positioned at or adjacent to said first side of said sheet, said first adhesive strip positioned on said top surface of said sheet, said first adhesive strip positioned closer to said first side of said sheet than said first crease, said first adhesive strip is a preapplied adhesive strip having a top adhesive surface, said first adhesive strip includes a removable top protective release liner that, when removed, exposes said top adhesive surface of said first adhesive strip; and
    wherein said top adhesive surface of said first adhesive strip configured to form an adhesive bond capable of connecting together an adjacently positioned surface protector and capable of forming a dust-proof bond and a liquid-proof bond with the adjacently positioned surface protector;
  providing a second surface protector having a top surface and a bottom surface;
  positioning said first surface protector on said floor surface;
  positioning said second surface protector on said floor surface such that a portion of said bottom surface of said second surface protector overlies a portion of said first surface protector; and
  causing said first and second surface protectors to engage one another to cause said bottom surface of said second surface protector to adhesively connect to said top adhesive surface of said first adhesive strip on said first surface protector to form a permanent connection between said first and second surface protector and to form a dust-proof connection between said first and second surface protector, said adhesive connection between said first and second surface protectors is a liquid-proof connection.

28. The method as defined in claim 27, wherein said sheet is a single piece of paperboard or fiberboard.

29. The method as defined in claim 27, wherein said first adhesive strip is spaced from said first side of said sheet.

30. The method as defined in claim 27, wherein said sheet includes a second crease that is offset a distance inward from said first and second sides of said sheet and positioned on said same side of said sheet as said first crease, a longitudinal length of said second crease positioned parallel to said first crease, said first and second creases spaced from one another, said first adhesive strip positioned closer to said first side of said sheet than said first and second creases, said second crease positioned closer to said first crease than to said first adhesive strip, said first crease positioned a greater distance from said first adhesive strip than said second crease.

31. The method as defined in claim 30, wherein said sheet includes a third crease that is offset a distance inward from said first and second sides of said sheet and positioned on said same side of said sheet as said first and second creases, a longitudinal length of said third crease positioned parallel to said first and second creases, said first, second and third creases spaced from one another, said first adhesive strip positioned closer to said first side of said sheet than said first, second and third creases, said third crease positioned closer to said first side of said sheet and said first adhesive strip than to said first and second creases.

32. The method as defined in claim 27, wherein said sheet includes a second adhesive strip, said second adhesive strip positioned on the same side of said sheet as said first adhesive strip, said spaced from said first adhesive strip, said second adhesive strip includes a removable top protective release liner that, when removed, exposes said top adhesive surface of said second adhesive strip, said top adhesive surface of said second adhesive strip configured to form an adhesive bond capable of connecting together an adjacently positioned surface protector and capable of forming a dust-proof bond and a liquid-proof bond with the adjacently positioned surface protector.

33. The method as defined in claim 32, wherein said second adhesive strip is positioned parallel to said first adhesive strip.

34. The method as defined in claim 33, wherein said second adhesive strip is positioned on or closely adjacent to said second edge, a longitudinal length of said second adhesive strip is positioned parallel to said first and second side edges, a longitudinal length of said first and second adhesive strips positioned parallel to one another.

35. The method as defined in claim 27, further including the step of removing said removable top protective release liner from a portion of said first adhesive strip prior to said bottom surface of said second surface protector to engage said portion of said first adhesive strip.

36. The method as defined in claim 27, wherein said step of causing said first and second surface protectors to engage one another includes applying pressure to said top surface of said second surface protector, said step of applying pressure includes one or more processes selected from the group consisting of a) a person walking on said top surface of said second surface protector, b) rolling a roller over said top surface of said second surface protector, and c) moving a heavy device over said top surface of said second surface protector.

37. The method as defined in claim 27, wherein said second surface protector is formed of a sheet of bendable material having a perimeter, a top surface and a bottom surface; a first adhesive strip positioned at or adjacent to said perimeter of said sheet and positioned on said top surface or said bottom surface of said sheet, said first adhesive strip is a preapplied adhesive strip having a top adhesive surface; and said top adhesive surface forms an adhesive bond capable of connecting together an adjacently positioned surface protector.

38. The method as defined in claim 27, further including the step of folding said first surface protector along said first crease such that said first floor protector protects both a portion of said floor surface and a portion of a wall positioned adjacent to said floor surface.

\* \* \* \* \*